US005536405A

United States Patent [19]
Myrna et al.

[11] Patent Number: 5,536,405
[45] Date of Patent: Jul. 16, 1996

[54] STACKED MEMBRANE DISK ASSEMBLIES FOR FLUID SEPARATIONS

[75] Inventors: Roman Myrna, Charlotte; C. Glen Wensley, Rock Hill, both of N.C.

[73] Assignee: UOP, Des Plaines, Ill.

[21] Appl. No.: 241,371

[22] Filed: May 11, 1994

[51] Int. Cl.⁶ .................................................. B01D 63/00
[52] U.S. Cl. .......................... 210/321.75; 210/321.84; 210/450; 210/231; 210/346; 210/232; 210/445; 210/454; 96/7; 96/11
[58] Field of Search .................... 210/321.75, 321.72, 210/321.84, 488, 500.21, 433.1, 456, 346, 232, 445, 454, 450, 231; 96/7, 11

[56] References Cited

U.S. PATENT DOCUMENTS

| | | |
|---|---|---|
| 1,913,886 | 6/1933 | Kennedy . |
| 1,987,316 | 1/1935 | Zimmer . |
| 2,304,618 | 12/1942 | Williams . |
| 2,349,469 | 5/1944 | Sloan . |
| 2,359,475 | 10/1944 | Gauthier . |
| 2,592,527 | 4/1952 | Armstrong . |
| 2,757,803 | 8/1956 | Robinson et al. . |
| 2,902,164 | 9/1959 | Dornauf . |
| 3,083,834 | 4/1963 | Pall . |
| 3,152,988 | 10/1964 | Gutkowski et al. . |
| 3,156,106 | 11/1964 | Crane . |
| 3,259,248 | 7/1966 | Wiegand . |
| 3,390,546 | 7/1968 | Jewell . |
| 3,439,119 | 4/1969 | Gehrmann . |
| 3,497,070 | 2/1970 | Parkinson et al. ............... 210/347 |
| 3,528,554 | 9/1970 | Ogden et al. . |
| 3,570,280 | 3/1971 | Aske . |
| 4,025,425 | 5/1977 | Croopnick et al. ............. 210/321.84 |
| 4,132,649 | 1/1979 | Croopnick et al. ............. 210/347 |
| 4,134,642 | 1/1979 | Kapron et al. . |
| 4,203,305 | 5/1980 | Williams . |
| 4,230,646 | 10/1980 | Ghizzoni . |
| 4,243,536 | 1/1981 | Prolss ............................ 210/456 |
| 4,379,051 | 4/1983 | Hiesinger et al. ................ 210/231 |
| 4,597,868 | 7/1986 | Watanabe ....................... 210/321.84 |
| 4,601,824 | 7/1986 | Dreyer ............................ 210/232 |
| 4,613,436 | 9/1986 | Wight et al. .................... 210/232 |
| 4,678,578 | 7/1987 | Nodes et al. .................... 210/445 |
| 4,698,154 | 10/1987 | Mohn et al. .................... 210/232 |
| 4,707,258 | 11/1987 | Drori ............................... 210/333.1 |
| 4,759,845 | 7/1988 | Selesnick ........................ 210/450 |
| 4,790,700 | 12/1988 | Schwartzman . |
| 4,801,381 | 1/1989 | Niesen ........................... 210/321.84 |
| 4,855,048 | 8/1989 | Tang et al. ..................... 264/49 |
| 4,945,956 | 8/1990 | Bueyueklgueclue et al. . |
| 4,995,977 | 2/1991 | Hilgendorff et al. ............ 210/321.84 |
| 5,069,789 | 12/1991 | Mohn et al. .................... 210/321.84 |
| 5,106,506 | 4/1992 | Schmidt et al. ................. 210/321.84 |
| 5,130,020 | 7/1992 | Meckstroth .................... 210/264 |
| 5,244,578 | 9/1993 | Ohnishi et al. ................. 210/650 |
| 5,271,838 | 12/1993 | Rahimi et al. .................. 210/346 |
| 5,310,487 | 5/1994 | LaMonica ...................... 210/321.84 |

*Primary Examiner*—Ana M. Fortuna
*Attorney, Agent, or Firm*—Thomas K. McBride; John G. Tolomei

[57] ABSTRACT

Membrane disk assemblies include membrane disks which have feed and residue apertures formed through and bounded entirely by a perimetrical edge region of the disk. Preferably, the feed and residue apertures are formed though a fluid-impermeable support rim positioned in the perimetrical edge region of the membrane disk which serves to sealably bond the exterior membrane sheets and at least one interposed permeate carrier sheet one to another. Most preferably, the support rim includes inwardly directed lobes through which the feed and residue apertures are formed. The membrane disks will also include a central permeate aperture in fluid communication with the carrier sheet interposed between the pair of membrane sheets. When a number of such membrane disks are assembled in stacked relationship with the feed, residue and central permeate apertures registered, there will be formed respective feed, residue and permeate passageways through the stack. In order to create the desired flow of fluid through the stack of membrane disks and across the active surfaces of the membrane sheets, annular high and low pressure seals are interposed concentrically between adjacent membrane disks in the stack. In addition to providing necessary sealing functions, the high and low pressure seals define a slight, but significant, clearance space between immediately adjacent membrane sheets of membrane disks in the stack to allow for fluid flow between the feed and residue apertures.

27 Claims, 5 Drawing Sheets

STACKED MEMBRANE DISK ASSEMBLIES FOR FLUID SEPARATIONS

FIELD OF INVENTION

This invention is useful in the field of fluid separations whereby fluid components are separated from a mixture. In preferred forms, the present invention is embodied in a stacked membrane disk module assembly especially suited for use in high pressure fluid separation processes.

BACKGROUND OF THE INVENTION

A variety of commercial processes rely on the use of fluid separation techniques in order to separate one or more desirable fluid components from a mixture. For example, in the production of natural gas, it is typically necessary for the producer to strip carbon dioxide from natural gas in order to meet government regulatory requirements. It is also typically desirable in many chemical processes for hydrogen to be removed and recovered from gaseous process streams.

The use of membranes for fluid separations has achieved increased popularity over other known separation techniques. However, one major disadvantage of membranes for use in fluid separations is that the membranes must be supported in a "package" (sometimes referred to as a "module") which provides the requisite flow path to achieve the desired fluid separation. The membrane package must also exhibit sufficient structural integrity to withstand the pressures needed to effect separation in a given process. These physical demands of membrane packages become especially acute when the membrane package is used in high pressure separation processes (i.e., fluid separation processes having operating pressures of greater than about 500–1000 psi).

Recently, a stacked membrane disk assembly for fluid separations has been proposed in U.S. Pat. No. 4,613,436 issued to William W. Wight et al on Sep. 23, 1986 (hereinafter more simply referenced as "the Wight et al '436 Patent", the entire content of which is expressly incorporated hereinto by reference). According to the Wight et al '436 Patent, a compact stack of alternating layers of membrane disks with layers of feed fluid spacers is suggested. Each such layer is provided with a pair of notches formed in the perimetrical edge and a central aperture. The respective notches and apertures of each layer are registered when stacked such that the registered notches collectively form respective feed and residue channels, while the registered apertures collectively form a permeate channel.

Sealing beads (e.g., bead 40 shown in FIG. 3 and bead 57 shown in FIG. 4 of the Wight et al '436 Patent) extend around the perimetrical edge of the feed fluid spacers from one notch to the other. The sealing beads are thus discontinuous around the edge of the feed fluid spacers in the area of the notches (see, column 9, lines 18–21 of the Wight et al '436 Patent). In use, these discontinuous edge beads cooperate in conjunction with edge seals associated with the distribution plates and feed fluid spacers of the assembly disclosed in the Wight et al '436 Patent (i.e., edge seals 104 and 180 shown in FIGS. 9 and 10, respectively). These edge seals thereby serve as a pressure seal against the interior surface of the pressure vessel in which the assembly is positioned so that the feed and residue channels are collectively defined by the registered notches and a corresponding adjacent interior surface of the pressure vessel wall. In addition, the discontinuous sealing beads employed in the assembly disclosed in the Wight et al '436 Patent serve to fluid-isolate interior regions of the pressure vessel on opposing sides of the stacked membrane disk assembly so as to establish a pressure gradient (e.g., between 1–5 psi) between the feed inlet and residue discharge ports.

While the stacked membrane disk assembly disclosed in the Wight et al '436 Patent represented a significant advance in the art of fluid separations, there exist several practical disadvantages associated with the assembly's required notches and discontinuous sealing beads. As noted above, since the sealing beads are discontinuous, in order to effectively fluid-isolate the feed and residue channels from one another, the beads must make effective sealing contact with the interior surface of the pressure vessel wall. As a consequence, the interior surface of the pressure vessel wall must be machined to very high tolerances to prevent even the slightest gap from existing between the discontinuous sealing beads and the interior surface vessel wall. For example, at high operating pressures of greater than between about 500–1000 psi, a very small gap between the discontinuous sealing beads and the interior surface vessel wall could cause failure of the membrane assembly (i.e., prevent the membrane assembly from performing its intended fluid separation functions).

SUMMARY OF THE INVENTION

The present invention generally represents improvements to the stacked membrane disk assembly disclosed in the Wight et al '436 Patent. In this regard, the present invention is embodied in a self-contained stacked membrane assembly. That is, the membrane assembly of the present invention is itself pressure-isolated and thus does not require edge seals to be formed with the interior surface of the pressure vessel wall. As a result, the only requirement on the internal dimensions of the pressure vessel is that sufficient space be provided to house the membrane assembly. In other words, the longitudinal and/or latitudinal size of the pressure vessel wall can be virtually any dimension since the perimetrical edge of the membrane assembly is not sealed against the interior pressure vessel wall in order to perform its intended fluid-separation functions. The membrane assembly of the present invention can thus be employed in existing pressure vessels in the field without timely (and costly) refurbishment or replacement.

Broadly, the stacked membrane disk assembly of the present invention includes membrane disks which have feed and residue apertures which are formed through and bounded entirely by a perimetrical edge region of the disk. Preferably, the feed and residue apertures are formed though a fluid-impermeable support rim positioned in the perimetrical edge region of the membrane disk which serves to sealably bond the exterior membrane sheets and at least one interposed permeate carrier sheet one to another. Most preferably, the support rim includes inwardly directed lobes through which the feed and residue apertures are formed.

The membrane disks will also include a central permeate aperture in fluid communication with the carrier sheet interposed between the pair of membrane sheets. When a number of such membrane disks are assembled in stacked relationship with the feed, residue and central permeate apertures registered, there will be formed respective feed, residue and permeate passageways through the stack.

In order to create the desired flow of fluid through the stack of membrane disks and across the active surfaces of the membrane sheets, annular high and low pressure seals are interposed concentrically between adjacent membrane disks in the stack. In addition to providing necessary sealing functions, the high and low pressure seals define a slight, but significant, clearance space between immediately adjacent membrane sheets of membrane disks in the stack to allow for fluid flow between the feed and residue apertures.

The low pressure seal is positioned in annular registered relationship to the perimetrical edge regions of the stacked membrane disks such that the registered feed and residue apertures are positioned radially inwardly thereof. The high pressure seal, on the other hand, is positioned concentrically around the central permeate apertures of the stacked membrane disks. Thus, the high pressure seal fluid-isolates the central permeate fluid passageway from the feed and residue passageways, while the low pressure seal fluid-isolates the feed and residue fluid passageways from the pressure condition existing within a pressure vessel in which the stacked membrane disks are used. In such a manner, therefore, the fluid flowing through the feed passageway is directed into the clearance space between immediately adjacent membrane sheets of an adjacent pair of stacked membrane disks to allow a fluid component in the feed fluid to permeate through the membrane sheets. This permeated fluid component will then flow along the interposed carrier sheet to the permeate fluid passageway where it collects and is removed externally of the stacked membrane disks. The residue fluid which contains a depleted amount of the permeated fluid component will thus flow across the membrane sheets in the space between an adjacent pair of membrane disks to the residue fluid passageway.

The number of membrane disks in the stack is dependent upon the particular fluid separation that is desired. Typically, however, a fluid separation module will be comprised of several hundred to several thousand stacked membrane disks. In order to enhance the structural integrity of the module, rigid reinforcement plates provided with appropriate apertures may be interposed at desired regular intervals (e.g., between every 25th and 26th membrane disk in the stack).

Because the module of this invention is self-contained (i.e., does not rely upon seals to be formed between its exterior periphery and the interior surface of the pressure vessel in which it is used), a desired number of modules may be serially connected to one another so that fluid exiting the residue passageway of one module is directed into the feed passageway of the next module in the series. A flexible conduit may then fluid-connect the residue passageway of the last module in the stack to a residue discharge port of the pressure vessel. In any event, since the module of this invention is not sealed against the interior surface of the pressure vessel, it is necessary for the residue passageway of the module to be connected via a conduit (which is preferably flexible) to the residue discharge port of the pressure vessel so that the entire interior of the pressure vessel will assume the pressure condition of the feed fluid.

Further aspects and advantages of this invention will become more clear after careful consideration is given to the detailed description of the preferred exemplary embodiments thereof which follow.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
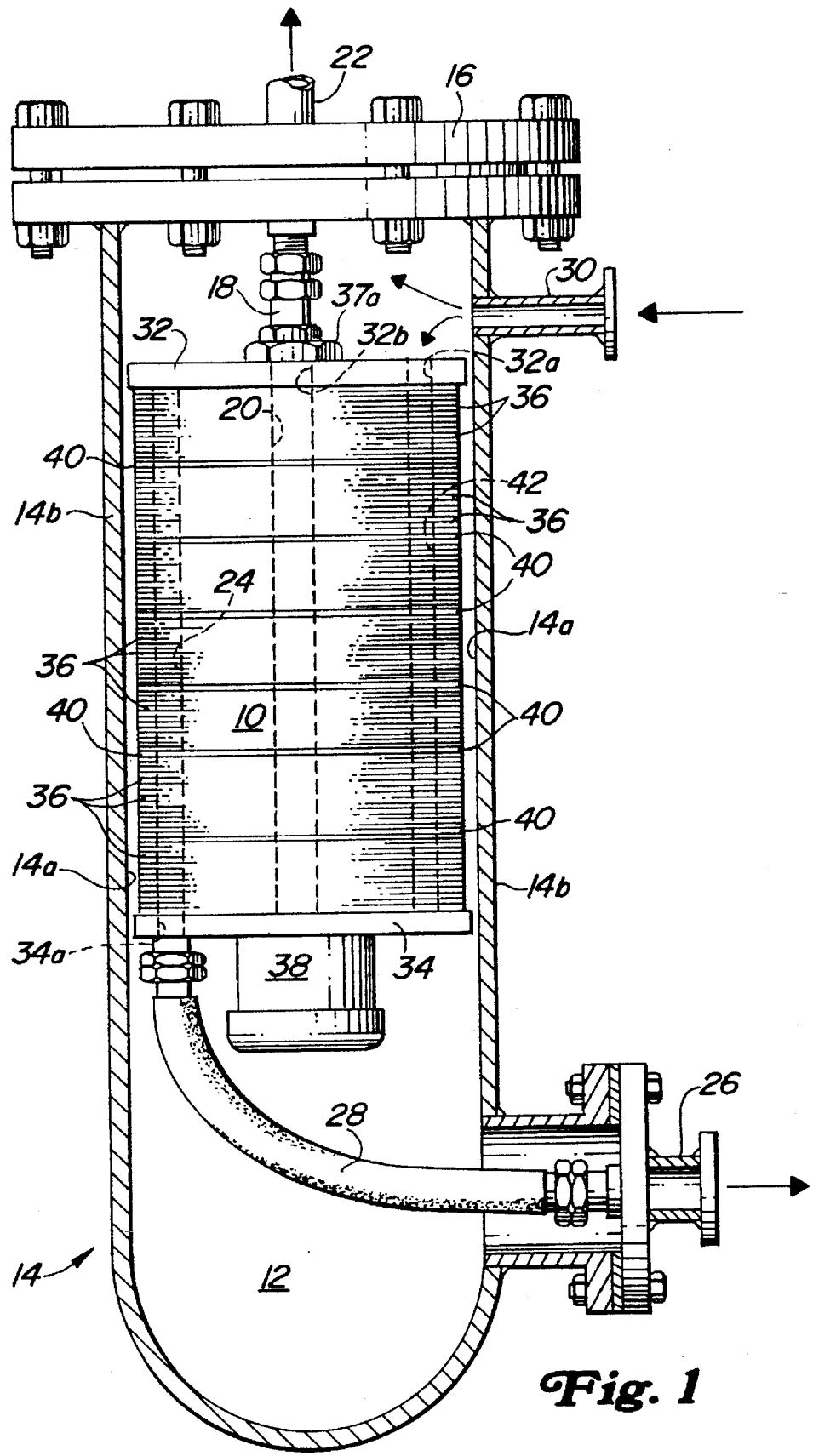
FIG. 1 is a cross-sectional elevational view of a pressure vessel which houses a preferred stacked membrane disk assembly according to the present invention.

Accompanying FIG. 1 depicts an exemplary stacked membrane module 10 according to this invention positioned within the interior chamber 12 of pressure vessel 14. The module 10 is dependently supported by the upper flange 16 of the pressure vessel 14 via the pipe stem 18 which fluid-connects the permeate passageway 20 defined centrally within the module 10 to a conduit 22 external of the pressure vessel 14 to allow the collected permeate fluid to be transferred to another location.

The residue passageway 24 defined within the module 10 is, in turn, fluid-connected to the discharge port 26 of pressure vessel 14 by conduit 28. Preferably, the conduit 28 is flexible but is of sufficient mechanical strength to withstand the pressure differential which exists between the feed fluid introduced into the pressure vessel via inlet port 30 and the pressure of the residue fluid within the conduit 28. Thus, virtually any flexible conduit may be employed such as reinforced elastomeric conduits, corrugated-type conduits or the like.

The module 10 includes axially spaced-apart end plates 32, 34 (preferably formed of metal) between which a number of membrane disks (some of which are identified in FIG. 1 by reference numeral 36) are positioned in registered stacked arrangement. The end plates 32, 34 and membrane disks 36 positioned therebetween are maintained as a contiguous unit by, for example, a bolt assembly 37 which comprises a rigid tube member within passageway 20 and engaging nuts 37a, 37b (see FIG. 3). Most preferably, a compressive force on the stack of membrane disks 36 within the module 10 is provided by a spring assembly contained within a sealed housing structure 38. Suitable spring assemblies which may be employed for such purpose are disclosed more fully in U.S. patent application Ser. No. 08/240,509 (Atty. Dkt. No. 426–48) filed even date herewith in the name of Myrna et al, the entire content of which is expressly incorporated hereinto by reference. In order to increase the structural integrity of the module 10 (e.g., to prevent warping of the membrane disks 36), rigid reinforcement plates 40 provided with appropriate apertures may be interposed at desired regular intervals, for example, between every 25th and 26th membrane disk 36 in the stack.

The module 10 also defines a feed fluid passageway 42 which communicates with opening 32a in end plate 32. Feed fluid containing at least one fluid component to be separated is thus introduced into the pressure vessel 14 at inlet port 30 and is directed into the feed fluid passageway 42. The end plate 32 also has an opening 32b which allows the central permeate passageway 20 to communicate with the stem 18. The end plate 34, on the other hand, defines a residue opening 34a which allows fluid communication between the residue passageway 24 within the module 10 and the conduit 28.

It will be observed in FIG. 1 that the exterior circumferential surface of the module 10 is spaced from the interior surface 14a of pressure vessel wall 14b. As such, the chamber 12 will be at a pressure condition corresponding to the pressure of the feed fluid introduced into the pressure vessel 14 via port 30. That is, according to the present invention, the exterior circumferential surface of the module 10 is not sealed against the interior surface 14a of pressure vessel wall 14b and, as such, does not establish different pressure conditions within the chamber 12.

Figure 2:
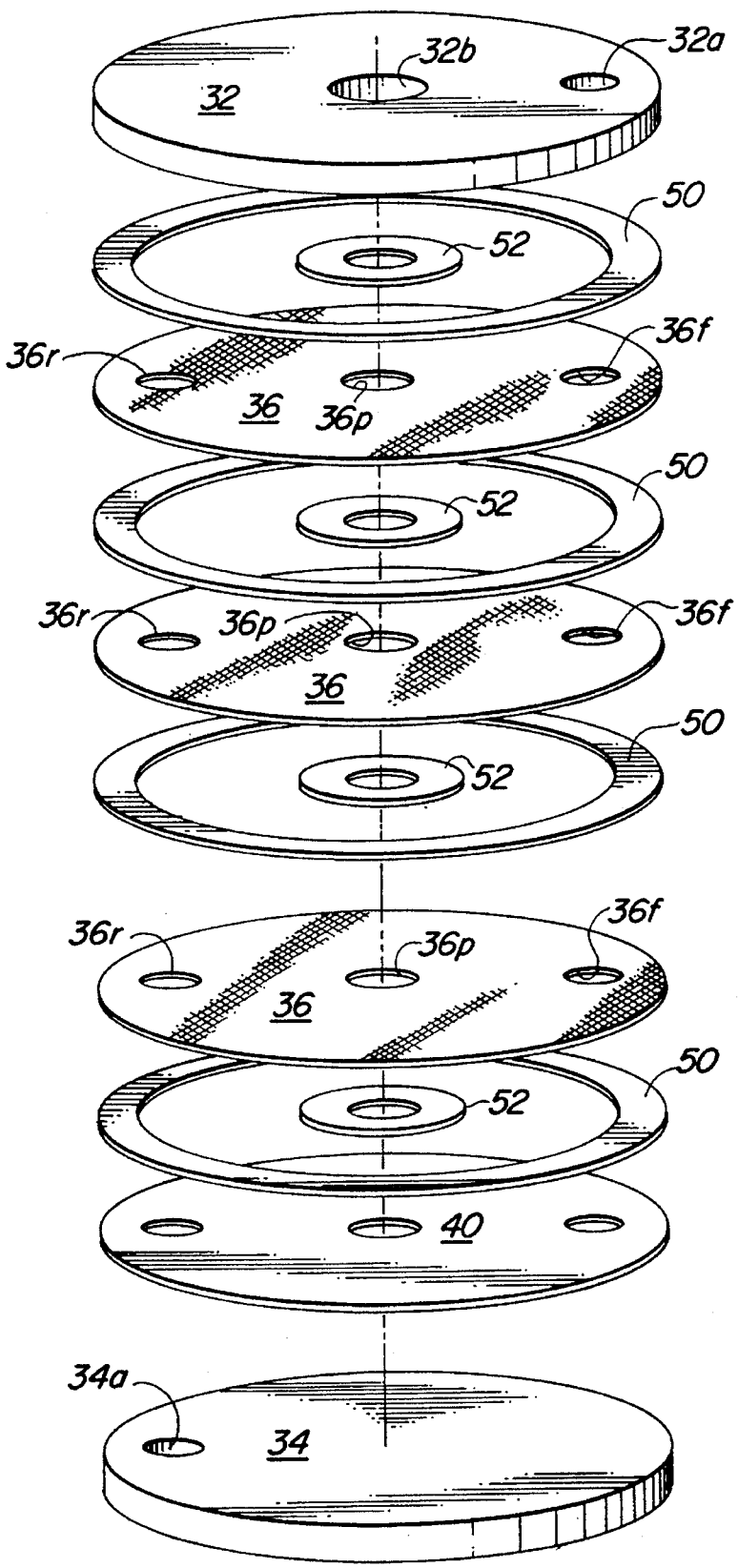
FIG. 2 is an exploded perspective view showing various representative components included within the preferred stacked membrane disk assembly according to the present invention.

A representative number of structural components which form the module 10 is shown in accompanying FIG. 2. As mentioned briefly above, the module 10 is comprised of a number of stacked membrane disks 36 positioned between the end plates 32 and 34, it being understood that several hundred or several thousand such membrane disks (which may optionally have interposed a reinforcement plate 40) will be provided as needed for adequate fluid separation. Important to the present invention, however, is the presence of low and high pressure seal rings 50, 52, respectively, positioned concentrically between adjacent components in the module—that is, between adjacent ones of the membrane disks 36, or between the end-most membrane disk 36 in the stack and an adjacent one of the end plates 32, 34, or between a membrane disk 36 and an adjacent one of the reinforcement plates 40.

The low and high pressure seals 50, 52, respectively, are interposed concentrically between adjacent membrane disks 36 in the module 10 and serve to create the desired flow of fluid relative to the stack of membrane disks 36. In addition to providing necessary sealing functions, the low and high pressure seals 50, 52 define a slight, but significant, clearance space $36_S$ between immediately adjacent membrane sheets $36_M$ of the membrane disks 36 in the stack to allow for fluid flow between the feed and residue apertures $36_F$ and $36_R$ (see FIGS. 3 and 4). Similarly, this clearance space $36_S$ is defined between the end-most membrane disks 36 in the stack and the end plates 32, 34 (and between a membrane disk 36 and an adjacent reinforcing plate 40, if present) by virtue of the annular seals 50, 52.

To accomplish this function, the low pressure seal 50 is positioned in annular registered relationship to the perimetrical edge regions of the stacked membrane disks 36 such that the registered feed and residue apertures $36_F$ and $36_R$, respectively, formed in each of the membrane disks 36 are positioned radially inwardly thereof. That is, the low pressure seal 50 is positioned radially outwardly of the apertures $36_F$ and $36_R$ so as to form a continuous seal about the perimetrical edge region of the membrane disks 36. The high pressure seal 52, on the other hand, is positioned concentrically around the central permeate apertures $36_P$ formed in each membrane disk 36. Thus, the high pressure seal 52 fluid-isolates the central permeate fluid passageway 20 (established by virtue of registered central permeate openings $36_P$) from the feed and residue passageways 42 and 24 (established by virtue of registered feed and residue openings $36_F$ and $36_R$, respectively). The low pressure seal 50, on the other hand, fluid-isolates the feed and residue fluid passageways $36_F$ and $36_R$, respectively, from the pressure condition existing within the chamber 12 of the pressure vessel 14. In other words, the low pressure seals 50 serve to pressure isolate the interior of the module 10 from the pressure condition existing within the surrounding space 12 of pressure vessel 14.

Figure 3:
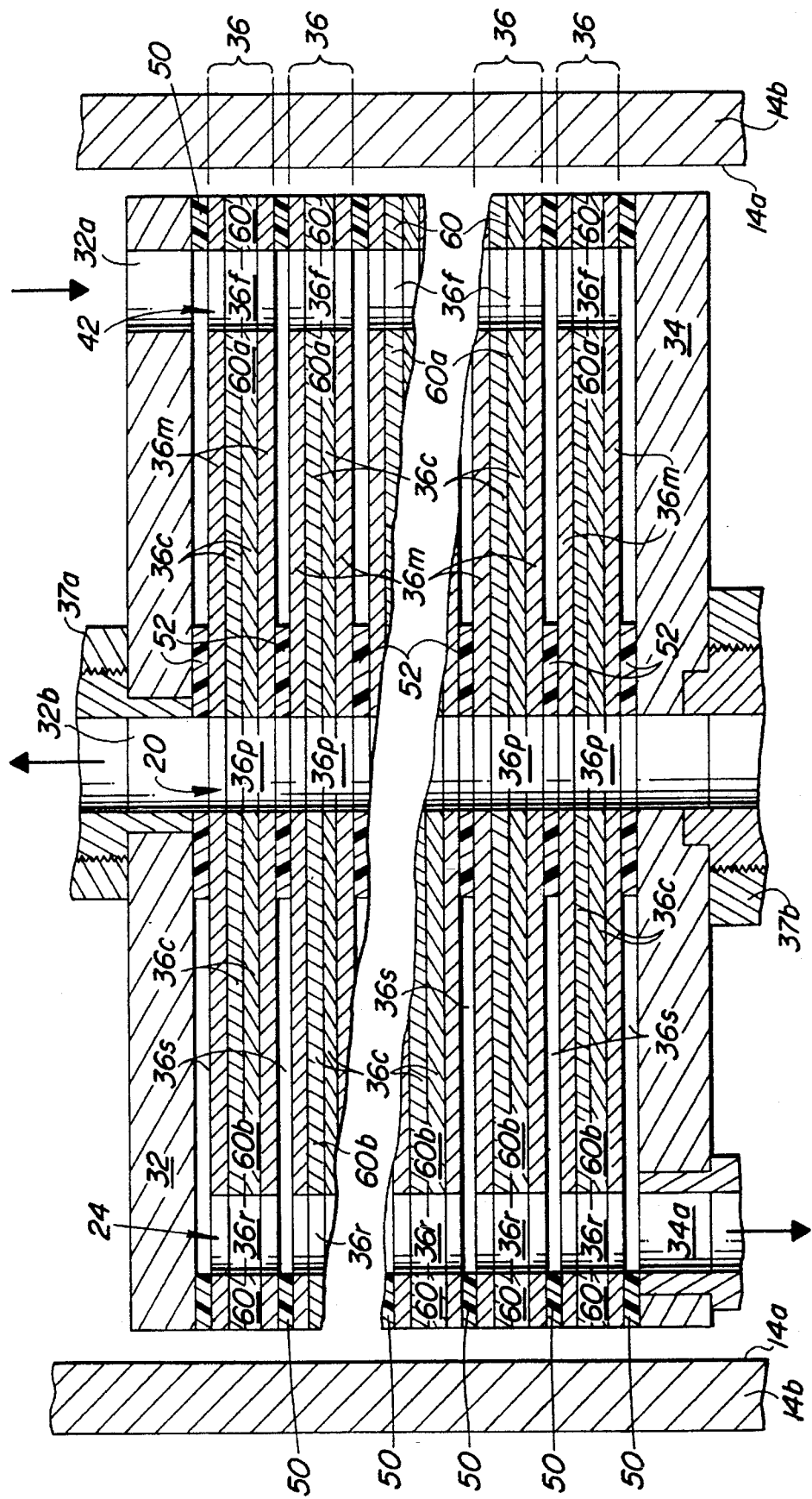
FIG. 3 is a cross-sectional elevational view of the membrane disk assembly according to the present invention housed within a pressure vessel and shown in a greatly enlarged manner for clarity of presentation.
Figure 4:
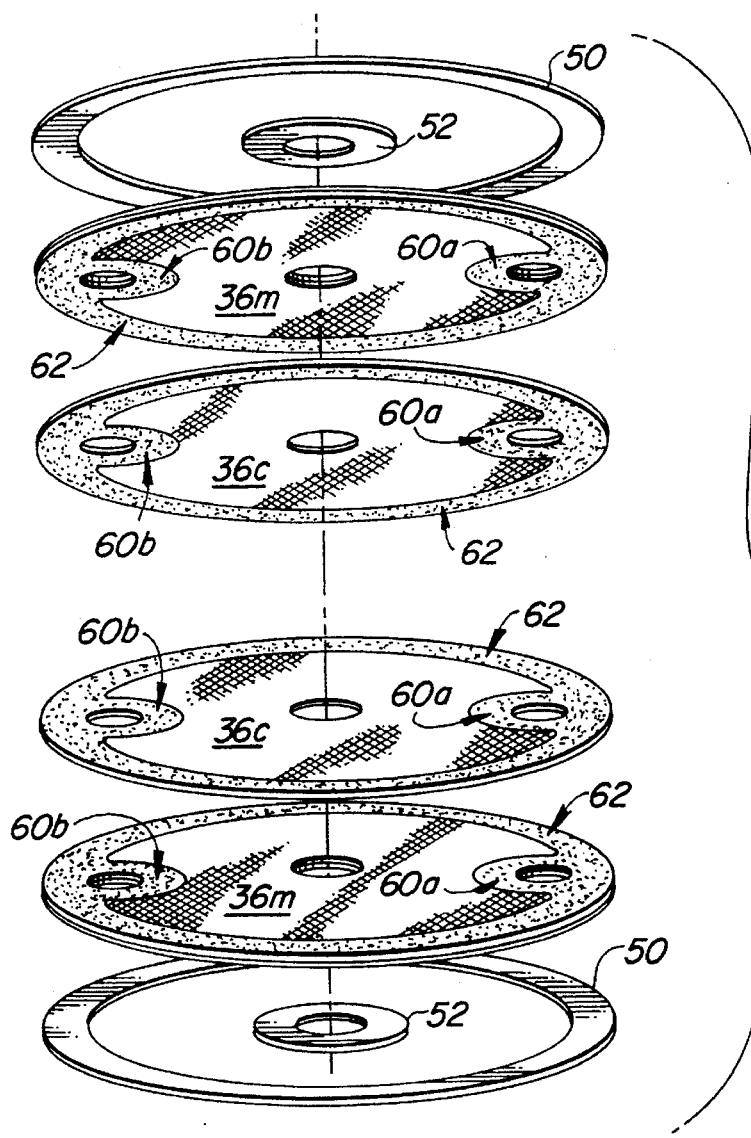
FIG. 4 is an exploded perspective view of a preferred representative membrane disk and associated pressure seals employed in the stacked membrane disk assembly according to the present invention.

FIG. 3 shows an assembled cross-section of the module 10 in a greatly enlarged manner for purposes of clarity, while FIG. 4 shows an exploded perspective view of a representative one of the membrane disks 36. As is seen more clearly in FIG. 3, the registration of apertures $36_P$, $36_R$ and $36_F$ will define the permeate, residue and feed fluid passageways 20, 24 and 42, respectively, within the module 10. Feed fluid entering the feed fluid passageway $36_F$ in module 10 via opening 32a will thus flow within the space $36_S$ over the active surfaces of the membrane sheets $36_M$ (which active surfaces are on the outermost side of the membrane disks 36 and thus face the space $36_S$) to the residue passageway 24.

Fluid flowing through the feed passageway 42 is directed into the clearance space $36_S$ between immediately adjacent membrane sheets $36_M$ of an adjacent pair of stacked membrane disks 36 to allow a fluid component in the feed fluid to permeate through the membrane sheets $36_M$. This permeated fluid component will then flow along the interposed carrier sheets $36_C$ to the permeate fluid passageway 20 where it collects and is removed externally of the module 10. The fluid which is rich in the non-permeating fluid component will thus be transferred to the residue fluid passageway 24 within the space $36_S$ defined between adjacent membrane sheets $36_M$.

In order to effect fluid separations, (i.e., to obtain the requisite flow through the module 10 as described above) a pressure differential condition $\Delta P_1$ must exist between the feed and residue fluid passageways 42 and 24, respectively, which is substantially less than a pressure differential condition $\Delta P_2$ existing between the feed and permeate fluid passageways, 42 and 20, respectively. For example, when employing the module 10 of this invention during high pressure gas separation processes (e.g., to separate $CO_2$ from natural gas), $\Delta P_1$ may typically be in the range of 3–5 psi, while $\Delta P_2$ may be in the range of several hundred psi.

The membrane disks 36 also include an annular fluid-impermeable support rim 60 which serves to provide a continuous fluid-tight seal about the entire lateral edge of the membrane disks 36. The support rim 60 also imparts structural support and improves the mechanical integrity of the membrane disks 36. Most preferably, the support rim 60 is in the form of a cured adhesive material which saturates the carrier sheets $36_C$ and thereby sealably bonds the carrier sheets $36_C$ and membrane sheets $36_M$ one to another in an integral structure about a perimetrical edge region thereof (noted by the stippled region identified by reference numeral 62 in FIG. 4). Alternatively, a rigidifying spacer element (not shown) could be interposed between the carrier sheets $36_C$.

The adhesive used to form support rim 60 must, of course, be matched physically and chemically to the characteristics of the membrane sheets $36_M$ for the particular separation environment intended. In this regard, the adhesive should be sufficiently fluid during application to wet-out and penetrate the membrane and carrier sheets $36_M$ and $36_C$, respectively, but be sufficiently rigid upon curing so as to perform its sealing and support functions. Preferably, the adhesive will be an epoxy adhesive satisfying the above criteria, for example, liquid epoxy resin based on bisphenol-A commercially available from Ciba-Geigy Corporation of Hawthorne, N.Y.

As an alternative, the support rim 60 may be in the form of a heat-sealed region (assuming of course that the materials forming the membrane and carrier sheets $36_M$ and $36_C$, respectively, are capable of being heat sealed). The use of heat-sealing would not, however, be as beneficial as a cured adhesive in terms of mechanical integrity. Notwithstanding this fact, the use of a heat-sealed region for the support rim 60 may be employed satisfactorily for some fluid-separation processes, particularly those processes having a relatively low pressure environment.

Importantly, the support rim 60 is positioned so as to be radially outward of the feed and residue apertures $36_F$ and $36_R$, respectively. Most preferably, the support rim 60 includes a pair of integral inwardly directed lobes 60a, 60b through which are defined the feed and residue apertures $36_F$ and $36_R$, respectively. Thus, the cured resin forming the lobes 60a, 60b will completely surround (and hence seal radially) the feed and residue apertures $36_F$ and $36_R$, respectively.

The lobes 60a, 60b need not be integral with the support rim 60. However, since it is desirable to have the feed and residue apertures $36_F$ and $36_R$, respectively, positioned as close to the edge of the membrane disk 36 as possible (i.e., so as to maximize the separation efficiency of each membrane disk 36), providing the lobes 60a, 60b as integral components of the support rim 60 has certain functional benefits. In addition, forming the lobes 60a, 60b as an integral component of the support rim 60 improves manufacturing efficiencies.

Virtually any membrane that may be employed to separate one or more fluid components from a fluid mixture may be employed satisfactorily as the membrane sheets $36_M$. The membrane sheets $36_M$ may be porous (i.e., membranes having a dense plurality of pores with a defined and uniform size) or non-porous (i.e., membranes having no pores or pores which are smaller than the fluid component to be separated thereby). Thus, as used herein and in the accompanying claims, the term "membrane" and like terms are meant to refer to any material which is capable of separating one or more fluid components for a fluid mixture. Specific examples of suitable membranes include cellulosic membranes such as described in U.S. Pat. Nos. 4,855,048 and 4,234,642, as well as polyimide membranes such as disclosed WO 9429002, the entire content of such U.S. Patents and pending Patent Application being incorporated expressly hereinto by reference. The membrane sheets $36_M$ are most preferably composed of an outwardly facing active membrane layer with one or more support layers (e.g., woven or non-woven fabrics, porous films or the like).

The carrier sheets $36_C$ receive the permeate fluid from the back side of the membrane sheets $36_M$ and serve to transport the permeate fluid to the permeate fluid passageway 20. The carrier sheets $36_C$ also serve to maintain the physical integrity of the membrane sheets $36_M$, particularly when the membrane disks are employed in high pressure fluid separations. Thus, the carrier sheets $36_C$ may be virtually any material which satisfies these design criteria. Most preferably, the carrier sheets $36_C$ are fabrics, such as, the tricot-knitted polyester fabric coated with an epoxy stiffener commercially available from Hornwood Inc. of Lilesville, N.C., as Style No. 1229.

The low and high pressure seals 50, 52, respectively, may be formed of the same or different materials. When the module 10 is intended to be employed in high pressure separation processes (i.e., greater than about 500–1000 psi), it is preferred that the seals 50, 52 be formed of different materials suited for the particular pressure differentials they will encounter. For example, the low pressure seal 50 may be formed of virtually any elastomeric or plastics film material (e.g., polyurethane film) which is capable of sealing against the relatively low pressure differential of between about 3–5 psi that may be encountered during a high pressure separation process.

On the other hand, if employed in high pressure separation processes, the high pressure seal is most preferably formed of a material which has a high coefficient of static friction (e.g., greater than 0.5) and exhibit sufficient elasticity to allow compression between 5–30% so as to be deformable in such a manner that the high pressure seal conforms to surface irregularities of the membrane sheet $36_M$. That is, for high pressure separations, the high pressure seal 52 should achieve a seal with the membrane sheet $36_M$ to allow for localized separation space of no greater than about 0.1 μm to exist therebetween. Preferably, for such high pressure separations, the high pressure seal 52 is formed of a silicone rubber, polyurethane rubber or like material.

Figure 5:
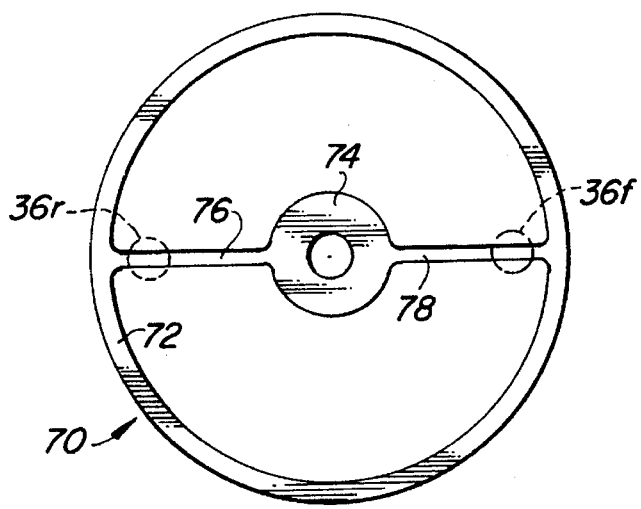
FIG. 5 is a plan view showing an alternative pressure seal member that may be employed in the stacked membrane disk assembly according to the present invention.

When used in relatively low pressure separation processes (i.e., less than about 300–500 psi), however, the pressure differentials existing between the various fluid passageways 20, 24 and 42 within module 10 are not that extreme. As a result, the low and high pressure seals may be formed into an integral (preferably unitary) structure. Accompanying FIG. 5 shows an example of a suitable sealing structure 70 comprised of concentric annular low and high pressure seals 72, 74 (which serve the same functions as the low and high pressure seals 50, 52, respectively, discussed above) integrally joined to one another by means of radial struts 76, 78. The width-wise dimension (i.e., as measured parallel to the plane of the seals 72, 74) of struts 76, 78 must be less than the cross-sectional dimension of the feed and residue apertures $36_F$ and $36_R$ of the membrane disks 36 so as to provide for sufficient free area to allow adequate fluid flow therebetween.

Figure 6:
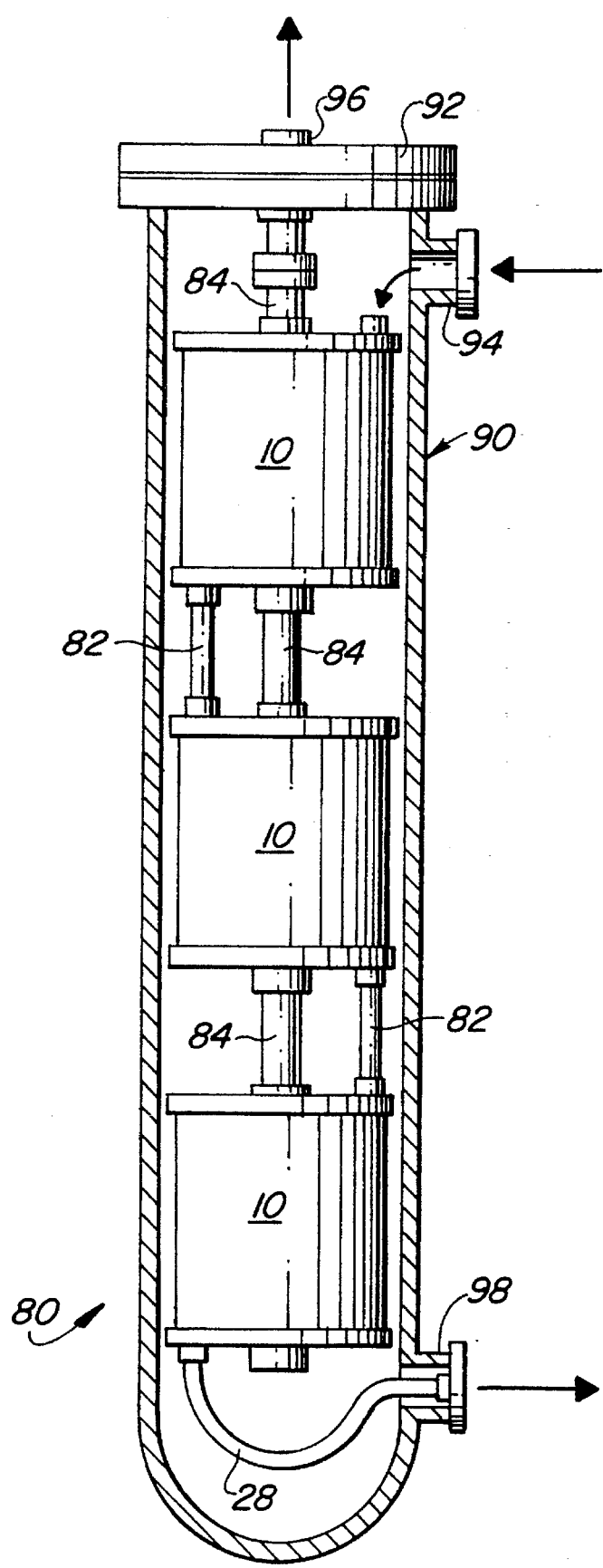
FIG. 6 is a cross-sectional elevational view of a pressure vessel which houses serially interconnected stacked membrane disk assemblies according to the present invention.

Since the module 10 according to this invention is self-contained (i.e., does not rely upon seals to be formed between its exterior periphery and the interior surface of the pressure vessel in which it is used), a desired number of such modules 10 may be connected serially to one another so that fluid exiting the residue passageway 24 of one module is directed to the feed passageway 42 of the next module 10 in series. Such a separation assembly 80 is shown in accompanying FIG. 6. In this regard, it will be noted that intermediate flexible conduits 82 serve to connect the residue and feed passageways of the modules 10 in series. Intermediate rigid permeate pipe stems 84, on the other hand, serve to fluid-connect the permeate passageways of the modules 10 and also dependently support the modules 10 from the flange 92 of pressure vessel 90. Thus, feed fluid entering the pressure vessel 90 through feed port 94 will flow serially through the modules 10 so as to separate the feed fluid into a permeate fluid component (which exits the pressure vessel 90 via port 96) and a residue fluid component (which exits the pressure vessel 90 via port 98).

The fluid separation assemblies, modules and membrane disks as described above represent several advances in this art. For example, since the modules 10 are self-contained they may be employed in existing pressure vessels without substantial modification (i.e., since the size of the pressure vessel is no longer critical to the proper functioning of modules). Furthermore, the module disks themselves offer advantages in terms of ease of automated manufacture by industrial robotics and thus can be produced efficiently on a large scale.

Therefore, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fluid separation module comprising:
   at least two adjacent stacked membrane disks, each said disk including,
   a) a pair of membrane sheets for separating a fluid component from a feed fluid mixture;
   b) at least one permeate carrier sheet disposed between said pair of membrane sheets;
   c) a continuous annular fluid-impermeable support rim sealably bonded to said membrane and permeate carrier sheets about a perimetrical edge region thereof and completely surrounding the lateral edge of the membrane disks to provide a continuous fluid-tight seal about the entire lateral edge of the membrane disk;
   d) a central permeate aperture; and
   e) feed and residue apertures bounded entirely by said support rim within said perimetrical edge region wherein
   said permeate, feed and residue apertures of said at least two adjacent stacked membrane disks are respectively registered to establish permeate, feed and residue passageways, and wherein said module further comprises:
   a first seal ring positioned concentrically between said at least two adjacent stacked membrane disks in annular registered relationship to said perimetrical edge region such that said feed and residue apertures are positioned radially inwardly thereof and said first seal ring extends completely around said perimetrical edge region; and
   a second seal ring positioned concentrically between said at least two adjacent stacked membrane disks in annular registered relationship to said central permeate aperture; wherein
   said first and second seal rings define a space between adjacent ones of said membrane sheets of said at least two adjacent membrane disks in said stack to establish fluid-communication between said feed and residue passageways and thereby allow flow of said feed fluid across said membrane sheets from said feed passageway to said residue passageway such that a fluid component in said flow of feed fluid permeates through said membrane sheets and is directed to said central permeate passageway along said at least one permeate carrier sheet.

2. A module as in claim 1, wherein said support rim consists essentially of an adhesive which bonds said membrane and permeate carrier sheets one to another.

3. A module as in claim 1 or 2, wherein said support rim includes a pair of inwardly directed lobes, and wherein said feed and residue apertures are formed through respective ones of said lobes.

4. A module as in claim 1, wherein said first and second seal rings are joined by at least one radially extending strut.

5. A module as in claim 1, wherein said first and second seal rings are joined by a pair of opposing radially extending struts.

6. A module as in claim 5, wherein said struts extend through a cross-sectional area defined by said registered feed and residue apertures and have a dimension substantially less than said defined area.

7. A module as in claim 1, capable of operating within a pressure vessel having a pressure condition of at least about 500 psi.

8. A fluid-separation membrane disk comprising:
   a) a pair of membrane sheets for separating a fluid component from a feed fluid mixture;
   b) at least one permeate carrier sheet disposed between said pair of membrane sheets;
   c) a continuous annular fluid-impermeable support rim sealably joined to said membrane and permeate carrier sheets about a perimetrical edge region thereof and completely surrounding the lateral edge of the membrane disk to provide a continuous fluid-tight seal about the entire lateral edge of the membrane disk;
   d) a central permeate aperture in fluid-communication with said at least one permeate carrier sheet; and
   e) feed and residue apertures formed through and bounded entirely by said support rim within said perimetrical edge region to fluid-isolate said feed and residue apertures from said central permeate aperture.

9. A membrane disk as in claim 8, wherein said support rim includes a pair of inwardly directed lobes, and wherein said feed and residue apertures are formed through respective ones of said lobes.

10. A membrane disk as in claim 8 or 9, wherein said support rim consists essentially of an adhesive which bonds said membrane and permeate carrier sheets one to another.

11. A fluid separation module which comprises a number of stacked membrane disks according to claim 10.

12. A fluid separation module which comprises a number of stacked membrane disks according to claim 8 or 9.

13. A membrane disk as in claim 8, in which a pair of said carrier sheets are interposed between said pair of membrane sheets.

14. Apparatus for separating fluid components from a feed fluid mixture under pressure comprising:
   a pressure vessel having walls which establish an internal pressure chamber, a feed fluid inlet port in fluid communication with said internal pressure chamber, and a pair of fluid discharge ports; and
   at least one membrane module positioned within said pressure vessel in spaced-apart relationship to said walls such that said internal pressure chamber thereof is at a pressure condition corresponding to the pressure of said feed fluid,
   said membrane module including a stack of adjacent membrane disks defining a first fluid passageway and a pair of second fluid passageways, and sealing layers interposed between said adjacent membrane disks so as to seal an entire external periphery of said membrane module from said pressure condition of said internal pressure chamber, wherein
   said apparatus further comprises conduits fluid-connecting said first passageway and one of said second fluid passageways with respective said pair of fluid discharge ports.

15. Apparatus as in claim 14, wherein said membrane disks include,
   a) a pair of membrane sheets,
   b) a permeate carrier sheet disposed between said pair of membrane sheets,
   c) a support rim joined to and supporting said membrane and permeate carrier sheets about an annular region thereof and completely surrounding the lateral edge of the membrane disk to provide a continuous fluid tight seal about the entire lateral edge of the membrane disk d) a central first aperture, and e) a pair of second apertures radially spaced from said central first aperture, said second apertures being bounded by said support rim, wherein said central first apertures of each said membrane disk in said stack are registered with one another to establish said first fluid passageway, and said pair of second apertures of each said membrane disk in said stack are registered to establish said respective pair of second fluid passageways.

16. Apparatus as in claim 15, wherein said support rim consists essentially of an adhesive which bonds said membrane and permeate carrier sheets one to another.

17. Apparatus as in claim 15 or 16, wherein said support rim includes a pair of inwardly directed lobes, and wherein said pair of second apertures are formed through respective ones of said lobes.

18. Apparatus as in claim 14, wherein said sealing layers each include a first seal ring positioned concentrically between at least two adjacent membrane disks in the stack in annular registered relationship to said perimetrical edge region such that said pair of second apertures are positioned radially inwardly thereof.

19. Apparatus as in claim 18, wherein said sealing layers each include a second seal ring positioned concentrically between at least two adjacent membrane disks in the stack in annular concentric relationship about said central first aperture.

20. Apparatus as in claim 19, wherein said first and second seal rings are joined by at least, one radially extending strut.

21. Apparatus as in claim 19, wherein said first and second seal rings are joined by a pair of opposing radially extending struts.

22. Apparatus as in claim 21, wherein said struts extend through a cross-sectional area defined by said pair of second apertures and have a dimension substantially less than said defined area.

23. Apparatus as in claim 14, wherein said sealing layers each include a second seal ring positioned concentrically between at least two adjacent membrane disks in the stack in annular concentric relationship about said central first aperture.

24. Apparatus as in claim 14, which comprises a plurality of said membrane modules, and interconnecting conduits fluid-connecting said plurality of membrane modules one to another in series.

25. Apparatus as in claim 24, wherein said interconnecting conduits are flexible conduits.

26. Apparatus as in claim 14 or 24, wherein at least one said membrane module includes rigidifying plates interposed at selected intervals between an adjacent pair of said membrane disks.

27. Apparatus as in claim 14, wherein at least one of said conduits is flexible.

* * * * *